United States Patent
Zhang et al.

(10) Patent No.: US 11,786,880 B2
(45) Date of Patent: Oct. 17, 2023

(54) PREPARATION METHOD OF THE MICROCAPSULES FOR LOW-TEMPERATURE WELL CEMENTATION TO BE USED TO CONTROL CEMENT HYDRATION HEAT

(71) Applicants: Southwest Petroleum University, Chengdu (CN); Yao Bai Special Cement Technology Research and Development Co., Ltd., Xi'an (CN)

(72) Inventors: Chunmei Zhang, Chengdu (CN); Jingxuan Cai, Chengdu (CN); Jia Wang, Chengdu (CN); Xiaowei Cheng, Chengdu (CN); Kaiqiang Liu, Chengdu (CN); Ping Wang, Chengdu (CN); Hao Xu, Chengdu (CN); Bibo Dai, Chengdu (CN); Baoyang Ke, Chengdu (CN); Xiaoyang Guo, Chengdu (CN); Mingze Li, Chengdu (CN); Song Yang, Chengdu (CN); Zheng Xi, Chengdu (CN)

(73) Assignees: SOUTHWEST PETROLEUM UNIVERSITY, Chengdu (CN); YAO BAI SPECIAL CEMENT TECHNOLOGY RESEARCH AND DEVELOPMENT CO., LTD., Xi'an (CN)

( * ) Notice: Subject to any disclaimer, the term of this patent is extended or adjusted under 35 U.S.C. 154(b) by 0 days.

(21) Appl. No.: 17/750,054

(22) Filed: May 20, 2022

(65) Prior Publication Data
US 2022/0395796 A1    Dec. 15, 2022

(30) Foreign Application Priority Data
Jun. 15, 2021    (CN) .......................... 202110661829.6

(51) Int. Cl.
 B01J 13/04    (2006.01)
 C04B 20/00    (2006.01)
 C09K 5/06    (2006.01)
 C09K 8/467    (2006.01)

(52) U.S. Cl.
 CPC ......... *B01J 13/043* (2013.01); *C04B 20/0004* (2013.01); *C09K 5/06* (2013.01); *C09K 8/467* (2013.01)

(58) Field of Classification Search
None
See application file for complete search history.

*Primary Examiner* — Jeffrey D Washville
(74) *Attorney, Agent, or Firm* — Muncy, Geissler, Olds & Lowe, P.C.

(57) ABSTRACT

A preparation method of the microcapsules for low-temperature well cementation to be used to control cement hydration heat includes: (S1) a shell material, and added into deionized water, then the resultant mixture being stirred in a thermostat water bath so as to completely dissolve it into a homogeneous and stable shell material solution; (S2) a core material and an emulsifier being put into a three-necked flask and stirred in a thermostat water bath so as to uniformly emulsify and disperse them, forming a stable oil-in-water core material emulsion, while adjusting the pH value of the emulsion with a pH adjuster; (S3) the three-necked flask containing the core material emulsion being transferred to a water bath, and then the shell material solution being dropwise added into it with stirring, after reacting, a solid-liquid mixture being poured out so as to naturally cool it to room temperature.

2 Claims, 3 Drawing Sheets

PREPARATION METHOD OF THE MICROCAPSULES FOR LOW-TEMPERATURE WELL CEMENTATION TO BE USED TO CONTROL CEMENT HYDRATION HEAT

FIELD OF THE INVENTION

The present invention relates to the technical field of well cementation for exploiting oil-gas field, in particular to a preparation method of the microcapsules for low-temperature well cementation to be used to control cement hydration heat, which is suitable for an oil well cement paste system under low-temperature conditions and used to control the hydration heat of a low-temperature early-strength cement paste.

BACKGROUND OF THE INVENTION

With the rapid development of petroleum industry in China, it is becoming more and more difficult to exploit oil-gas resources, while it is becoming an inevitable trend to exploit oil-gas resources in deep-water, ultra-deep water and extremely cold regions, as an important strategy for petroleum industry in China. The oil in place with 20 billion tons, and the natural gas reserves with about 40 trillion cubic meters both are now ascertained in the South China Sea, and accounting for ⅓ of total resources in China, but 70% of both are stored within the deep-water region with $153.7 \times 10^4$ $km^2$. Furthermore, exploiting oil-gas in the deep-water, ultra-deep water, extremely cold regions and other unconventional regions will encounter extremely complex and adverse circumstances, as a huge challenge for drilling operations, and the success or failure of entire drilling engineering and the production life of oil-gas wells hinge upon the quality of the well cementation acting as a last process of drilling engineering.

The well cementation for the deep-water, ultra-deep water and extremely cold regions involves many problems to be solved, such as low-temperature environment (ranging from −1.7° C. to 5° C., reaching −30° C. in polar regions), shallow water-gas flow, lack of experience in deep-water operations and natural disasters. In addition, it is an unavoidable problem to encounter natural gas hydrates only stably existing at a low-temperature and a high pressure, during exploring deep-water oil-gas, but the heat released by a cement paste during a hydration process will cause a natural gas hydrate to decompose, and resultantly leads to submarine landslides, formation collapses and the likes, posing a huge threat to the safe production of oil-gas wells. As the process of hardening and hydrating G-grade oil well cement commonly used for well cementation in a low-temperature environment is greatly retarded, it is difficult for the process to obtain the early-strength and capacity to prevent shallow water-air flow in a short time, and the process cannot meet the requirements of well cementation. Therefore, developing the high-quality oil well cement with low-temperature hydration or improving the capability to harden and hydrate G-grade oil well cement at a low-temperature so as to enhance the early-strength, and enable the circulation of oil well cement to maintain its integrity throughout the entire normal production life of oil-gas wells is of great significance to improve the quality of well cementation and meet the production requirements of long-term safe exploitation of oil-gas wells.

At present, the most research is widely directed to compound different types of cement so as to enhance the early strength of cement stones, and meet the requirements of construction for well cementation in low-temperature regions. Among them, domestic researchers mostly employ fast sulfoaluminate cement to compound G-grade high-sulphate-resistant cement or employ calcium sulfoaluminate, tricalcium silicate, dicalcium silicate, gypsum and other mineral phases to develop cement systems; Some scholars also employ C-grade oil well cement or A-grade oil well cement to develop a low-temperature oil well cement system. However, as the higher early strength is brought about with the higher hydration heat, its application become limited.

Some domestic researchers introduced paraffins into a low-temperature oil well cement paste system to control hydration heat, but its application effect cannot have been verified at lower temperatures, despite achievement with a good thermal control effect under curing conditions above 15° C. Furthermore, the paraffins have a high phase-transition point, and is not sensitive enough to temperature changes. In addition, urea-formaldehyde resin is mostly used as the shell material in the existing research, having poor compatibility with the cement-stone paste and delaying the cement hydration process.

SUMMARY OF THE INVENTION

The present invention aims to provide a preparation method of the microcapsules for low-temperature well cementation to be used to control cement hydration heat, which is of reliable principle and easy operation. The microcapsules prepared with a binary composite phase-change material acting as a core material and active silica acting as a shell material have good compatibility with a cement paste, with stable structure and low phase-change temperature, so it can be used in a low-temperature oil well cement system to solve the problem such as too high phase-change temperature and insufficient sensitivity to temperature, thus has a prospect for use in a broad market.

In order to achieve the above technical purpose, the present invention provides the following technical solutions.

A preparation method of the microcapsules for low-temperature well cementation to be used to control cement hydration heat includes the following steps in proper order:

(1) a shell material being weighted with 10-20 g, and added into a beaker containing 50-100 mL of deionized water, then the resultant mixture being stirred magnetically in a thermostat water bath at 45° C. so as to completely dissolve it into a homogeneous and stable shell material solution;

(2) 10-20 g of a core material and 0.02-0.1 g of an emulsifier being put into a three-necked flask and stirred in a thermostat water bath at 45° C. for 30-60 min at a rotation speed of 2000 rpm so as to uniformly emulsify and disperse them, forming a stable oil-in-water (O/W) core material emulsion, while adjusting the pH value of the emulsion to descend below 5.5 with a pH adjuster.

(3) the three-necked flask containing the core material emulsion being transferred to a water bath at 50-90° C., and then the shell material solution being dropwise added into it with stirring at a rotation speed of 300-1200 rpm, after reacting for 2-3 hours, a solid-liquid mixture being poured out so as to naturally cool it to room temperature, thus the cooled mixture being processed by suction filtration, washed with ethanol and deionized water, respectively, to remove impurities, and finally being processed by freeze-drying to obtain a white powder sample.

In step 1, the shell material is sodium silicate $NaSiO_3 \cdot 9H_2O$.

In step 2, the core material is a binary composite phase-change material prepared by n-decanoic acid and lauryl alcohol, and the preparation process is as follows: n-decanoic acid and lauryl alcohol are mixed with each other by mass ratio of 1:1, and stirred evenly.

In step 2, the emulsifier is a mixture of alkylphenol polyoxyethylene ether-10 (OP-10) and cetyl trimethyl ammonium bromide (CTAB), wherein the mass ratio of the cetyl trimethyl ammonium bromide (CTAB) is 20-80%.

In step 2, the pH adjuster is hydrochloric acid HCl, and the pH value of the adjusted emulsion ranges from 0.5 to 5.5.

The reaction process of the above-mentioned microcapsules reducing the hydration heat is as follows:

The microcapsule core material forms the stable core material emulsion under the action of the emulsifier OP-10 and CTAB. Due to the presence of the cationic emulsifier, the surface of the core material emulsion is electropositive. When the sodium silicate is added to the acidic stable emulsion, the sodium silicate will decompose into electronegative silicate ions. Under the action of electrostatic force, the cationic emulsifier concentrates the electronegative silicate ions on the surface of the emulsion; in addition, under the action of hydrogen bonds, the nonionic emulsifier also concentrates the silicate ions on the surface of the electropositive emulsion. As the entire reaction environment is acidic, the silicate ions interact with hydrogen ions in the solution to form the precursor of silica, forming a dense layer on the surface of the emulsion, and further performing dehydration and condensation so as to form the shell material of silica.

The microcapsules synthesized in the present invention by using an organic phase-change material as the core material and an active amorphous silica as the shell material can reversibly absorb and release the hydration heat of cement. As the core material is a phase-change material, it can store and release heat by changing its physical state as the external temperature changes. When the cement hydrates and releases heat, the core material of the microcapsules will perform phase-change to absorb excess hydration heat and store the heat. When the cement hydrates to a certain extent, the decrease in the external temperature enables the heat stored inside the microcapsule core material to release outwards so as to raise the local ambient temperature, promote the continuous hydration of cement, and increase the early-strength. The microcapsules not only improve the early compressive strength, but also perform double functions to reduce the hydration heat and prevent gas channeling.

Compared with the prior art, the present invention has the following beneficial effects:

(1) The binary composite phase-change material and the active silica are used to prepare microcapsules to control the hydration heat of a cement paste with sensitivity to temperature and good compatibility to a cement paste.

(2) The microcapsules have high chemical stability and good storability.

(3) The raw materials of the microcapsules have wide sources, low costs, and an advantage of reducing costs and increasing efficiency.

(4) The microcapsule synthesis method is simple and enables large-scale production.

In summary, in the present invention, silica is used as the shell material of the microcapsules, having good compatibility with the cement system, and can partially perform hydration reaction as an active component; while a binary composite organic phase-change material free of supercooling degree, with less corrosiveness to cement-based materials and low phase-transition point is used as the core material of the microcapsules. The present invention applies the microcapsules with the core-shell structure to the low-temperature oil well cement system, so that the cement can obtain higher early-strength at a low-temperature, reducing the outward discharge of hydration heat, and overcoming the problems such as poor compatibility between the shell material of the microcapsules and a cement paste, and insufficient sensitivity to temperature and leakage for the core material.

DETAILED DESCRIPTION OF SOME EMBODIMENTS

Figure 1:
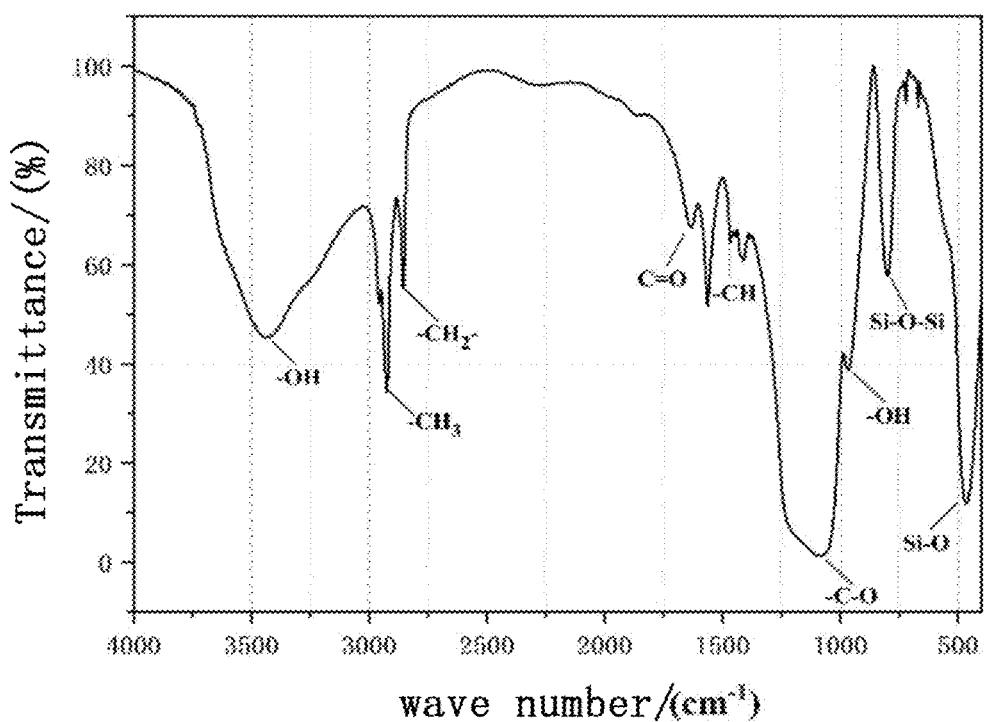
FIG. 1 is a Fourier transform infrared spectrum (FTIP) of the microcapsules prepared in Example 1.

The present invention is further described below according to the drawings and embodiments, so as to help a person skilled in the art to understand the present invention. However, it should be clear that the present invention is not limited to the scope of the specific embodiments, and in the view of the person skilled in the art, as long as various changes are within the spirit and scope of the present invention defined and determined by the appended claims, they are all claimed.

I. Preparation of the Microcapsules for Low-Temperature Well Cementation

EXAMPLE 1

Sodium silicate is weighted with 10 g, and added into deionized water (50 mL), then the resultant mixture is stirred magnetically at 45° C. for 10 min so as to completely dissolve. The mixed solution of lauryl alcohol (5 g) and n-decanoic acid (5 g), CTBA (0.05 g) and OP-10 (0.05 g) are put into a three-necked flask, maintaining heated at 45° C. and stirred for 30 min at a rotation speed of 2000 rpm so as to uniformly disperse the lauryl alcohol and n-decanoic acid, forming a oil-in-water (O/W) emulsion, while adjusting its pH value to be 1.5 with hydrochloric acid. The above emulsion is transferred to a thermostatic water bath at 50° C., and then the prepared sodium silicate solution is dropwise added into the three-necked flask by means of a separating funnel with stirring at a rotation speed of 300 rpm for 2 hours, subsequently, the product is transferred to a beaker and cooled to room temperature for suction filtration, then washed with absolute ethanol and deionized water and processed by freeze-drying.

EXAMPLE 2

Sodium silicate is weighted with 12 g, and added into deionized water (80 mL), then the resultant mixture is stirred magnetically at 45° C. for 10 min so as to completely dissolve. The mixed solution of lauryl alcohol (6 g) and n-decanoic acid (6 g), CTBA (0.03 g) and OP-10 (0.07 g) are put into a three-necked flask, maintaining heated at 45° C. and stirred for 30 min at a rotation speed of 2000 rpm so as to uniformly disperse the lauryl alcohol and n-decanoic acid, forming a oil-in-water (O/W) emulsion, while adjusting its pH value to be 2 with hydrochloric acid. The above emulsion is transferred to a thermostatic water bath at 60° C., and then the prepared sodium silicate solution is dropwise added into the three-necked flask by means of a separating funnel with stirring at a rotation speed of 500 rpm for 2 hours, subsequently, the product is transferred to a beaker and cooled to room temperature for suction filtration, then washed with absolute ethanol and deionized water and processed by freeze-drying.

EXAMPLE 3

Sodium silicate is weighted with 15 g, and added into deionized water (50 mL), then the resultant mixture is stirred magnetically at 45° C. for 10 min so as to completely dissolve. The mixed solution of lauryl alcohol (7 g) and n-decanoic acid (7 g), CTBA (0.02 g) and OP-10 (0.08 g) are put into a three-necked flask, maintaining heated at 45° C. and stirred for 30 min at a rotation speed of 2000 rpm so as to uniformly disperse the lauryl alcohol and n-decanoic acid, forming a oil-in-water (O/W) emulsion, while adjusting its pH value to be 2.5 with hydrochloric acid. The above emulsion is transferred to a thermostatic water bath at 70° C., and then the prepared sodium silicate solution is dropwise added into the three-necked flask by means of a separating funnel with stirring at a rotation speed of 600 rpm for 2.5 hours, subsequently, the product is transferred to a beaker and cooled to room temperature for suction filtration, then washed with absolute ethanol and deionized water and processed by freeze-drying.

EXAMPLE 4

Sodium silicate is weighted with 14 g, and added into deionized water (50 mL), then the resultant mixture is stirred magnetically at 45° C. for 10 min so as to completely dissolve. The mixed solution of lauryl alcohol (8 g) and n-decanoic acid (8 g), CTBA (0.03 g) and OP-10 (0.03 g) are put into a three-necked flask, maintaining heated at 45° C. and stirred for 30 min at a rotation speed of 2000 rpm so as to uniformly disperse the lauryl alcohol and n-decanoic acid, forming a oil-in-water (O/W) emulsion, while adjusting its pH value to be 3 with hydrochloric acid. The above emulsion is transferred to a thermostatic water bath at 80° C., and then the prepared sodium silicate solution is dropwise added into the three-necked flask by means of a separating funnel with stirring at a rotation speed of 600 rpm for 2.5 hours, subsequently, the product is transferred to a beaker and cooled to room temperature for suction filtration, then washed with absolute ethanol and deionized water and processed by freeze-drying.

EXAMPLE 5

Sodium silicate is weighted with 18 g, and added into deionized water (50 mL), then the resultant mixture is stirred magnetically at 45° C. for 10 min so as to completely dissolve. The mixed solution of lauryl alcohol (9 g) and n-decanoic acid (9 g), CTBA (0.08 g) and OP-10 (0.02 g) are put into a three-necked flask, maintaining heated at 45° C. and stirred for 30 min at a rotation speed of 2000 rpm so as to uniformly disperse the lauryl alcohol and n-decanoic acid, forming a oil-in-water (O/W) emulsion, while adjusting its pH value to be 1 with hydrochloric acid. The above emulsion is transferred to a thermostatic water bath at 90° C., and then the prepared sodium silicate solution is dropwise added into the three-necked flask by means of a separating funnel with stirring at a rotation speed of 800 rpm for 3 hours, subsequently, the product is transferred to a beaker and cooled to room temperature for suction filtration, then washed with absolute ethanol and deionized water and processed by freeze-drying.

II. Structural Representations of the Microcapsules for Low-Temperature Well Cementation It can be seen from FIG. 1 that the strong absorption peak near 3320 $cm^{-1}$ is the stretching vibration of O—H, and this peak corresponds to alcoholic hydroxyl group. The absorption peaks near 2920 $cm^{-1}$ and 2850 $cm^{-1}$ pertains to C—H bonds, which correspond to —$CH_3$ and —$CH_2$. The sharp absorption peak of the strong infrared spectrum near 1709.85 $cm^{-1}$ is the stretching vibration of a carbon-oxygen double bond in —COOH. There are several weak absorption peaks of —OH in the range of 2700-2500 $cm^{-1}$, and few other peaks appear in this absorption peak range, so they can be used to judge the existence of carboxylic acid. There are the antisymmetric vibrational absorption peak of Si—O—Si at 1096 $cm^{-1}$ and the symmetrical vibrational absorption peak of Si—O—Si at 803.6 $cm^{-1}$. There are the bending vibration absorption peak of Si—OH at 941 $cm^{-1}$ and the vibration absorption peak of a Si—O group at 469 $cm^{-1}$. The above analysis can prove that the core material is successfully coated with silica, and there is no chemical reaction, but a simple physical combination, between the core material and the wall material.

Figure 2:
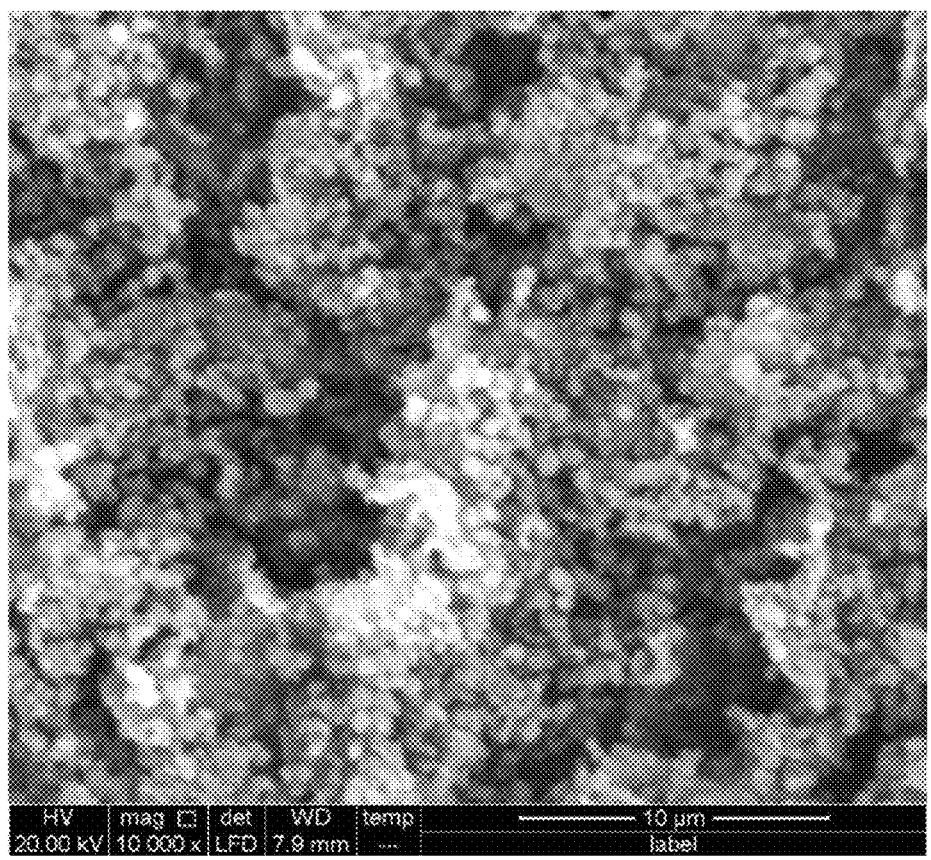
FIG. 2 is a microcosmic appearance photo of the microcapsules prepared in Example 1.

It can be seen from FIG. 2 that the microcapsules are spherical and fine particles, with uniform and regular distribution and good dispersion.

Figure 3:
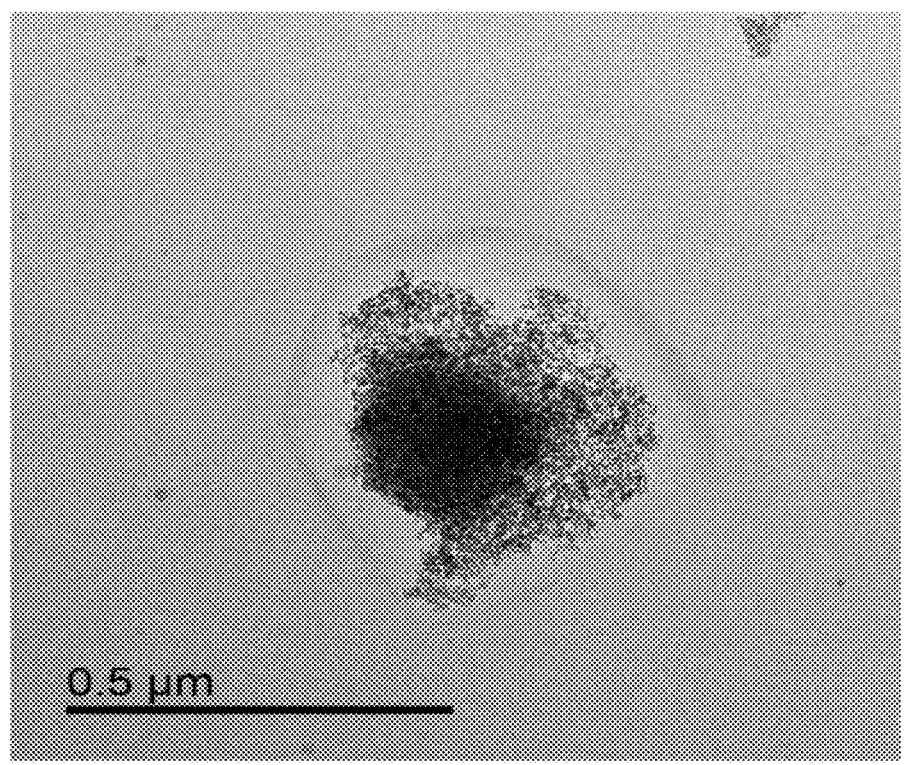
FIG. 3 is a TEM photo of the microcapsules prepared in Example 3.

It can be seen from FIG. 3 that the microcapsules have an obvious core-shell structure.

Figure 4:
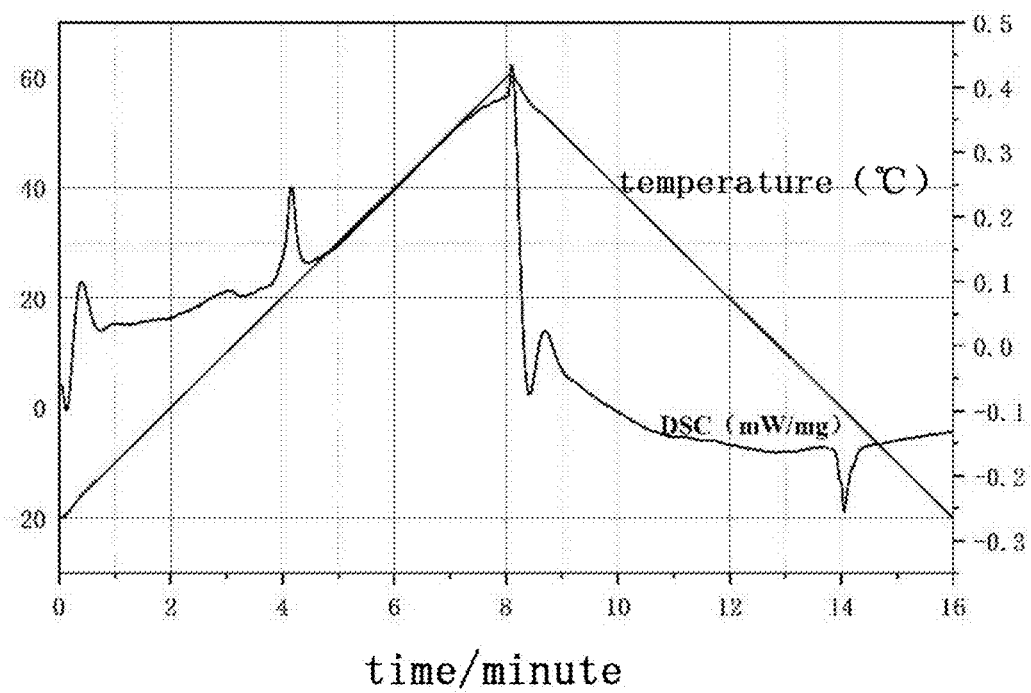
FIG. 4 is a differential scanning calorimetry (DSC) graph of the microcapsules prepared in Example 3.

III. Thermal Performance Analysis of the Microcapsules for Low-Temperature Well Cementation It can be seen from FIG. 4 that the phase-transition point of the microcapsules is 12.5° C. at the heating stage. At the cooling stage, the phase-transition point of the microcapsules is 0.13° C. It can be seen that the microcapsules are sensitive to the change of external temperature and more suitable for a low-temperature oil well cement system.

Figure 5:
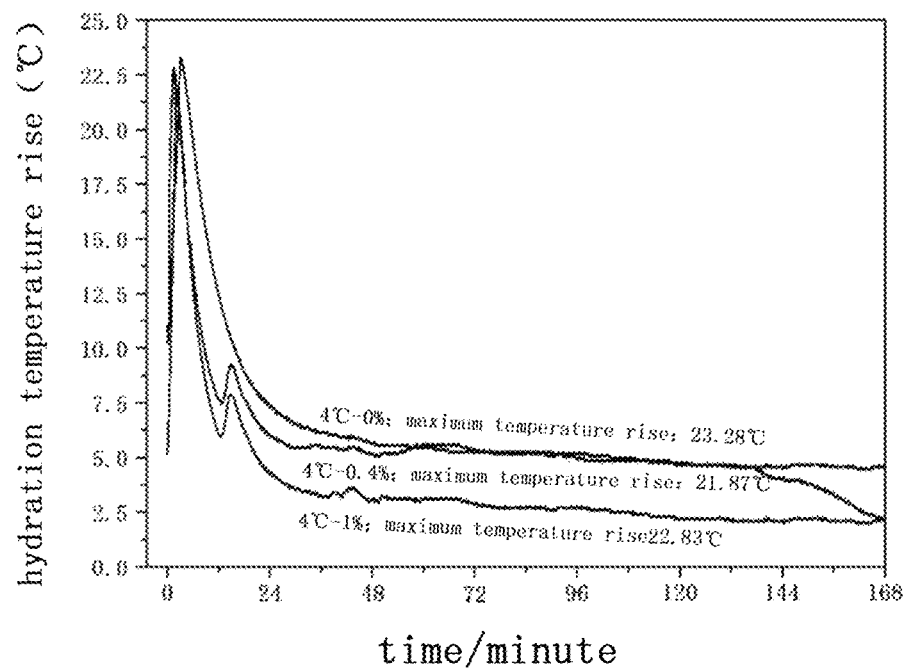
FIG. 5 shows the test results of the hydration heat of a cement paste containing the microcapsules measured at 4° C. outside.
Figure 6:
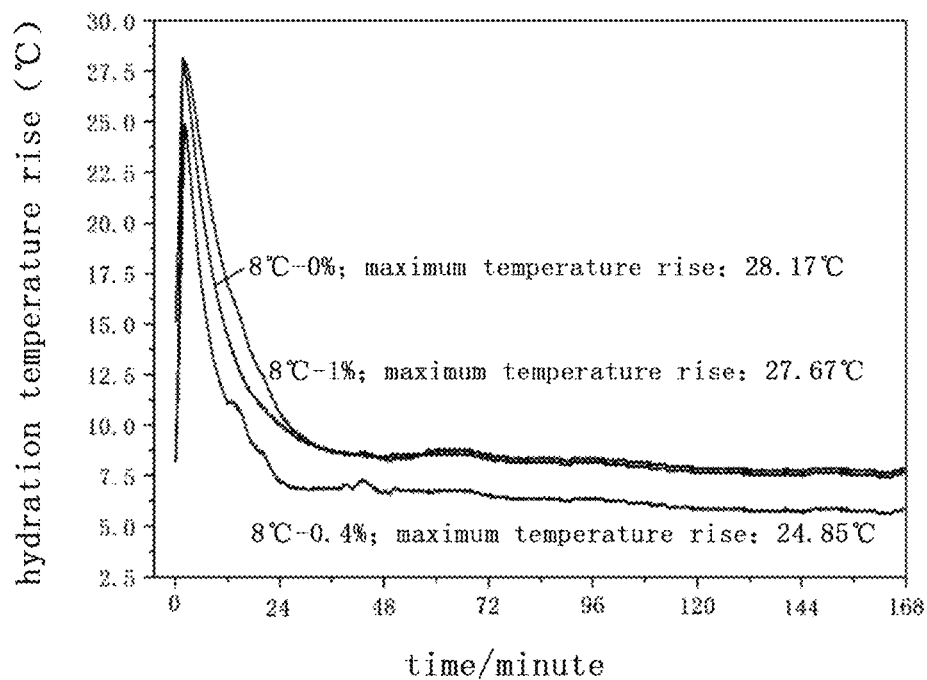
FIG. 6 shows the test results of the hydration heat of a cement paste containing the microcapsules measured at 8° C. outside.

FIGS. 5 and 6 show the test results of the hydration heat of a cement paste containing the microcapsules measured at 4° C. and 8° C. outside. It can be seen from the figures that the microcapsules can effectively reduce the hydration temperature rise of a cement paste.

What is claimed is:

1. A preparation method of the microcapsules for low-temperature well cementation to be used to control cement hydration heat, comprising the following steps in proper order:
   S1: a shell material being weighted with 10-20 g, and added into 50-100 mL of deionized water, then the resultant mixture being stirred in a thermostat water bath at 45° C. so as to completely dissolve it into a homogeneous and stable shell material solution, said shell material being sodium silicate $NaSiO_3 \cdot 9H_2O$;
   S2: 10-20 g of a core material and 0.02-0.1 g of an emulsifier being put into a three-necked flask and stirred in a thermostat water bath at 45° C. for 30-60 min so as to uniformly emulsify and disperse them, forming a stable oil-in-water core material emulsion, while adjusting the pH value of said emulsion to descend below 5.5 with a pH adjuster, where said core material is a binary composite phase-change material prepared by n-decanoic acid and lauryl alcohol, the preparation process of said binary composite phase-change material includes mixing n-decanoic acid with lauryl alcohol by mass ratio of 1:1, and stirring them evenly; said emulsifier is a mixture of alkylphenol polyoxyethylene ether-10 and cetyl trimethyl ammonium bromide, the mass ratio of the cetyl trimethyl ammonium bromide is 20-80%;

S3: said three-necked flask containing said core material emulsion being transferred to a water bath at 50-90° C., and then said shell material solution being dropwise added into it with stirring, after reacting for 2-3 hours, a solid-liquid mixture being poured out so as to naturally cool it to room temperature, thus said cooled solid-liquid mixture being processed by suction filtration, washed with ethanol and deionized water, respectively, to remove impurities, and finally being processed by freeze-drying.

2. The preparation method according to claim 1, wherein in S2 said pH adjuster is hydrochloric acid HCl.

* * * * *